(12) United States Patent
Mizukusa et al.

(10) Patent No.: US 11,812,157 B2
(45) Date of Patent: Nov. 7, 2023

(54) IMAGE PROCESSING DEVICE AND IMAGE PROCESSING PROGRAM

(71) Applicant: Kowa Company, Ltd., Nagoya (JP)

(72) Inventors: Yutaka Mizukusa, Nagoya (JP); Kunitoshi Shimizu, Nagoya (JP)

(73) Assignee: Kowa Company, Ltd., Nagoya (JP)

( * ) Notice: Subject to any disclaimer, the term of this patent is extended or adjusted under 35 U.S.C. 154(b) by 116 days.

(21) Appl. No.: 17/615,085

(22) PCT Filed: May 29, 2020

(86) PCT No.: PCT/JP2020/021406
§ 371 (c)(1),
(2) Date: Nov. 29, 2021

(87) PCT Pub. No.: WO2020/241844
PCT Pub. Date: Dec. 3, 2020

(65) Prior Publication Data
US 2022/0232155 A1 Jul. 21, 2022

(30) Foreign Application Priority Data
May 31, 2019 (JP) ................. 2019-102259

(51) Int. Cl.
*H04N 23/56* (2023.01)
*H04N 23/72* (2023.01)

(52) U.S. Cl.
CPC ............. *H04N 23/72* (2023.01); *H04N 23/56* (2023.01)

(58) Field of Classification Search
CPC ........ H04N 23/72; H04N 23/56; H04N 23/74; H04N 23/741; G03B 2206/00; G03B 2215/0557; G03B 7/28; G03B 15/05
See application file for complete search history.

(56) References Cited

U.S. PATENT DOCUMENTS

2006/0152764 A1* 7/2006 Loce .................. H04N 1/4052
358/3.06
2016/0037046 A1 2/2016 Nashizawa
(Continued)

FOREIGN PATENT DOCUMENTS

| JP | 2012243097 A | 12/2012 |
| JP | 2015232487 A | 12/2015 |
| JP | 2018013740 A | 1/2018 |

OTHER PUBLICATIONS

International Search Report and Written Opinion (English Translation for ISR only) for Application No. PCT/JP2020/021406, dated Aug. 18, 2020.
(Continued)

*Primary Examiner* — Mekonnen D Dagnew
(74) *Attorney, Agent, or Firm* — Dorsey & Whitney LLP (57) ABSTRACT

In order to obtain an inspection image without blown-out highlights generated due to specular reflection or the like or blocked-up shadows generated at a position to which light hardly reaches, an image processing device includes a plurality of light sources that irradiates an object with light and a control circuit that controls light emission of the plurality of light sources, a camera that photographs the object, and a processor that controls switching of a light emission pattern of the plurality of light sources and controls photographing execution timing of the camera, controls the plurality of light sources to emit light with a plurality of light emission patterns, performs photographing at timings during at least two or more patterns among the plurality of light emission patterns to obtain a plurality of intermediate images, and generates one final image based on the plurality of obtained intermediate images.

14 Claims, 7 Drawing Sheets

(56) References Cited

U.S. PATENT DOCUMENTS

2016/0112621 A1    4/2016  Nishi
2018/0330490 A1   11/2018  Kido
2019/0293409 A1*  9/2019  Matsuda .......... G01N 21/95607

OTHER PUBLICATIONS

The Extended European Search Report for European Patent Application No. 20815420.3 dated May 26, 2023, pp. all.

* cited by examiner

(a) EXAMPLES OF ACQUIRED INTERMEDIATE IMAGES

Fig. 5A (b) EXAMPLE OF GENERATED FINAL IMAGE
(WHEN MEDIAN VALUE IS ADOPTED)

Fig. 5B (c) EXAMPLE OF GENERATED FINAL IMAGE
(WHEN SPECULARITY DISTRIBUTION CORRECTION PROCESSING IS ADOPTED)

IMAGE PROCESSING DEVICE AND IMAGE PROCESSING PROGRAM

CROSS-REFERENCE TO RELATED APPLICATION(S)

This application is a U.S. National Stage filing under 35 U.S.C. § 371 of PCT Application No. PCT/JP2020/021406, filed May 29, 2020, which claims priority to Japanese Application No. 2019-102259, filed May 31, 2019, which are incorporated herein by reference, in their entirety, for any purpose.

TECHNICAL FIELD

The present invention relates to an image processing device and an image processing program for acquiring an inspection image without blown-out highlights generated due to specular reflection or the like or blocked-up shadows generated at a position to which light hardly reaches.

BACKGROUND ART

Conventionally, image diagnosis based on a photographed image of an object has been performed as a means of checking for defective products and detecting abnormalities. In recent years, image diagnosis using a learned model in which deep learning has been performed in advance using normal images and abnormal images, so-called image diagnosis by AI, or the like has also been performed.

With regard to an image to be used for image diagnosis, it is required to accurately photograph an object, but depending on a positional condition of a light source and a condition of a material, a surface angle, or the like of the object, specular reflection occurs and blown-out highlights are generated at the position. This can result in obtaining a photographed image in which the state of the object cannot be grasped. If blown-out highlights or blocked-up shadows are generated and the state of the object is not reflected in the photographed image, defective products or abnormal parts can be overlooked in image diagnosis.

Here, Patent Literature 1 discloses a photographed-image processing device capable of more easily obtaining a clear image without blown-out highlights or blocked-up shadows. The photographed-image processing device disclosed in Patent Literature 1 determines whether the brightness of a photographed image falls within a predetermined brightness range and performs, when a brightness state that causes blown-out highlights or blocked-up shadows is determined, photographing again after adjusting the brightness to prevent blown-out highlights or blocked-up shadows.

CITATION LIST

Patent Literature

Patent Literature 1: JP 2001-145018 A

SUMMARY OF INVENTION

Technical Problem

The photographed-image processing device disclosed in Patent Literature 1 performs re-photographing after adjusting the brightness if blown-out highlights or blocked-up shadows are generated in the photographed image. However, since the positional condition of the light source and the condition of the material, the surface angle, or the like of the object do not change, the fundamental influence of the specular reflection cannot be removed, and the photographed image in which the state of the object cannot be grasped can be obtained although the brightness adjustment has been performed.

The present invention has been made in view of the above problem and a purpose of the present invention is to provide an image processing device and an image processing program for acquiring an inspection image without blown-out highlights generated due to specular reflection or the like or blown-out highlights generated at a position to which light hardly reaches.

Solution to Problem

An image processing device according to the present invention includes a lighting unit including a plurality of light sources that irradiates an object with light and a control circuit that controls light emission of the plurality of light sources, a camera unit that photographs the object, and a control unit that controls switching of a light emission pattern of the plurality of light sources of the lighting unit and controls photographing execution timing of the camera unit, in which the control unit includes a light-emission-pattern control unit that controls the plurality of light sources of the lighting unit in such a manner as to be able to emit light with a plurality of light emission patterns, a photographing processing unit that performs photographing at timings during at least two or more patterns among the plurality of light emission patterns to acquire a plurality of intermediate images, and an image generation unit that generates one final image based on the plurality of acquired intermediate images.

In addition, in the image processing device according to the present invention, the image generation unit extracts representative regions from a plurality of regions, the plurality of regions each including at least one or more pixels and being at the same position in each of the plurality of intermediate images, and combines the representative regions to generate the final image.

In addition, in the image processing device according to the present invention, the image generation unit performs ranking of a plurality of regions based on gray values, the plurality of regions each including at least one or more pixels and being at the same position in each of the plurality of intermediate images, extracts representative regions based on the ranking, and combines the representative regions to generate the final image.

In addition, in the image processing device according to the present invention, the image generation unit extracts, as the representative regions, regions each having a median value of the gray values as a result of the ranking based on the gray values.

In addition, in the image processing device according to the present invention, the image generation unit regards, when there is a plurality of distributions at a position having a value higher than a predetermined upper-limit threshold for the gray values and/or a position having a value lower than a predetermined lower-limit threshold for the gray values, the plurality of distributions as a predetermined fixed number regardless of an actual number of distributions to perform the ranking based on the gray values.

In addition, in the image processing device according to the present invention, the control unit classifies the plurality of light sources into a plurality of blocks and to perform on/off control for each block to change the light emission pattern.

In addition, in the image processing device according to the present invention, the control unit classifies the plurality of light sources into a plurality of blocks and to change luminance and/or color tone of the plurality of light sources for each block to change the light emission pattern.

An image processing program according to the present invention causes a computer to perform image generation processing of acquiring one final image from a plurality of intermediate images acquired by photographing an object a plurality of times, the image processing program causing the computer to perform a light-emission-pattern control function of controlling, with a plurality of light emission patterns, light emission of a plurality of light sources configured to irradiate the object with light, a photographing processing function of photographing the object with a camera at timings during at least two or more patterns among the plurality of light emission patterns to acquire a plurality of intermediate images, and an image generation function of generating one final image based on the plurality of acquired intermediate images.

Advantageous Effects of Invention

One or more deficiencies are solved by embodiments of the present application.

DESCRIPTION OF EMBODIMENTS

First Embodiment

Figure 1:
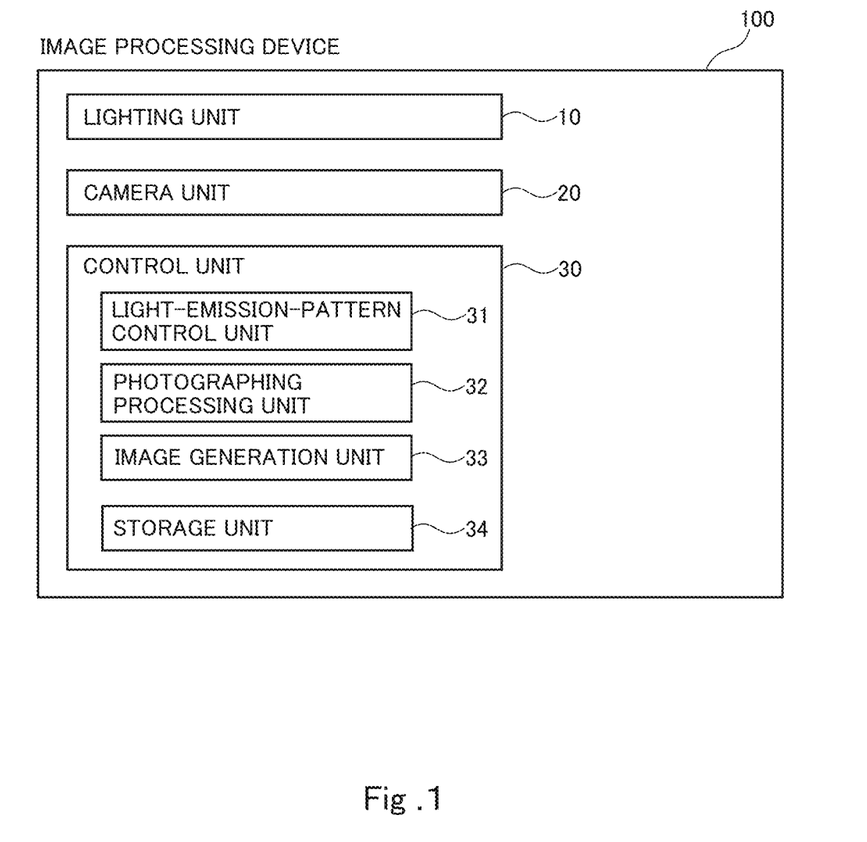
FIG. 1 is a block diagram illustrating an example of a configuration of an image processing device corresponding to at least one of embodiments of the present invention.

Hereinafter, an example of an image processing device according to a first embodiment of the present invention will be described with reference to the drawings. FIG. 1 is a block diagram illustrating an example of a configuration of an image processing device corresponding to at least one of the embodiments of the present invention. As illustrated in FIG. 1, an image processing device 100 includes a lighting unit 10, a camera unit 20, and a control unit 30.

Note that the image processing device 100 may be a device designed as a dedicated machine, but processing in the control unit 30 of the image processing device 100 can be performed by a general computer. That is, the control unit 30 of the image processing device 100 includes a central processing unit (CPU), a memory, and a storage such as a hard disk drive or an SSD that are normally included in a general computer, and also includes an input device such as a mouse and a keyboard, an output device such as a display and a printer, and a communication device for connecting to a communication network that may be connected via a bus. Processing in each unit of the control unit 30 of the image processing device 100 is performed by loading a program for performing processing in each unit from the memory and executing the program in the CPU or a GPU functioning as a control circuit (a processing circuit or a processing circuitry). In other words, a processor (a processing circuit) is configured to be able to perform processing in each device by executing the program. In addition, if the image processing device 100 is implemented as a dedicated machine, the image processing device 100 may have a configuration in which, for example, a built-in CPU controls the lighting unit 10 and the camera unit 20 and an image acquired by photographing by the camera unit 20 is processed by a frame memory and an FPGA.

An object to be photographed in the present example may be any object as long as it is an object to be subjected to image diagnosis, and a drill, an end mill, or the like of a cutting tool can be the object, for example. The image processing device 100 in the present example can be applied to acquire an image for image diagnosis for detecting scratches, abrasion, damages, and the like of a drill or an end mill. The object is not limited thereto, and any products or abnormal parts that can be overlooked due to occurrence of blown-out highlights generated by specular reflection or the like or blocked-up shadows generated at a position to which light hardly reaches can be the object in the present example.

The lighting unit 10 includes a plurality of light sources for irradiating an object to be photographed with light, and a control circuit for controlling light emission of the plurality of light sources. As the light sources, various light sources including a fluorescent lamp, an incandescent lamp, an LED, an electroluminescence light, and other light sources that are not exemplified can be adopted, and a plurality of LEDs can be adopted, for example. In addition, the light sources need to be capable of arbitrarily switching on/off of light emission and are preferably further capable of also being controlled to change the intensity of light emission. In addition, the arrangement of the plurality of light sources can be variously set, but the arrangement is desirable to be capable of irradiating the object to be photographed with light from various directions.

The camera unit 20 has a function for photographing an object. The photographing processing by the camera unit 20 can be controlled by the control unit 30.

The control unit 30 has a function of controlling switching of light emission patterns of the light sources of the lighting unit 10 and of controlling photographing execution timing of the camera unit 20. Specifically, the control unit 30 includes a light-emission-pattern control unit 31, a photographing processing unit 32, an image generation unit 33, and a storage unit 34.

The light-emission-pattern control unit 31 has a function of controlling the plurality of light sources of the lighting unit 10 in such a manner as to be able to emit light with a plurality of light emission patterns. By performing control to cause the plurality of light sources to emit light with the plurality of light emission patterns, it is possible to irradiate an object to be photographed with light from various directions. The light emission patterns may be any patterns, and a method in which, for example, the plurality of light sources is classified into a plurality of blocks (groups) and on/off control is performed for each block to constitute a plurality of light emission patterns by a combination of blocks being turned on and blocks being turned off is conceivable to perform the control. Furthermore, by enabling some blocks whose light emission is turned on among the plurality of blocks to be controlled to change the luminance of the plurality of light sources for each block, a plurality of light emission patterns having different intensity changes of the luminance may be constituted to perform the control. Note that the control of the light emission patterns does not necessarily need to be performed by being classified into blocks, and may be a control method of randomly switching on/off of light emission of individual light sources and adjustment of light emission intensity, or may be a control method of performing light emission control in such a manner that the light emission area and the light emission intensity gradually change in a specific direction. In addition, random control or gradation control may be applied after the plurality of light sources is classified into blocks. Furthermore, as the control of the light emission patterns, the color tone of the light sources may be changed. This is because, since the reflectance varies depending on the color tone, that the feature of an object can be possibly extracted by changing the color tone of the light applied to the object. As described above, changing the light emission patterns in the present example can include, in addition to the change by the on/off control of the light sources, control of changing the intensity of the luminance of the light sources and control of changing the color tone of the light sources.

The photographing processing unit 32 has a function of acquiring intermediate images by performing photographing at timings during at least two or more patterns among the plurality of light emission patterns. That is, photographing is performed on an object to be photographed in different-light irradiation situations to acquire a plurality of intermediate images. Preferably, by performing photographing at timings when the light emission patterns are switched by the light-emission-pattern control unit 31, that is, by performing photographing at timings synchronized with the switching control of the light emission patterns, the same number of intermediate images as the number of the plurality of light emission patterns is acquired. Note that it is not always necessary to perform photographing at timings synchronized with the switching control of the light emission patterns, and photographing may be performed by performing control at different timings. The plurality of acquired intermediate images is stored in, for example, the storage unit 34.

The image generation unit 33 has a function of generating one final image based on the plurality of acquired intermediate images. Specifically, a method of extracting representative pixels from a plurality of pixels at the same position in each of the plurality of intermediate images and combining the representative pixels to generate the final image is conceivable. That is, the processing is to select, for each pixel position, representative pixels from all the intermediate images to acquire a final image constituted by a combination of the representative pixels.

As the method of selecting representative pixels, a method in which, for example, gray values of a plurality of pixels at the same position in a plurality of intermediate images are acquired and ranking based on the gray values is performed to extract the representative pixels based on the ranking is conceivable. Here, a gray value refers to luminance information about a pixel. If a pixel is expressed by RGB information, the RGB information is converted into luminance information based on a known conversion formula to perform the ranking. In addition, the ranking means ranking from a pixel having a large luminance value to a pixel having a small luminance value, and this is synonymous with creating a gradation histogram while the arrangement position of each pixel can be specified. Note that there is no difference in whether a brighter pixel is set to be higher or the darker pixel is set to be higher, and there is no problem with either method. As the method of extracting representative pixels based on the ranking, a method of using a pixel whose luminance-value rank is positioned at a median value as a representative pixel, a method of using, as a representative pixel, a pixel whose luminance-value rank is at a predetermined rank position, for example, the luminance-value rank is within a predetermined percentage of the higher rank, and the like are conceivable.

The storage unit 34 has a function of storing information necessary for processing in each unit of the image processing device 100 and also storing various types of information generated in the processing in each unit.

Figure 2:
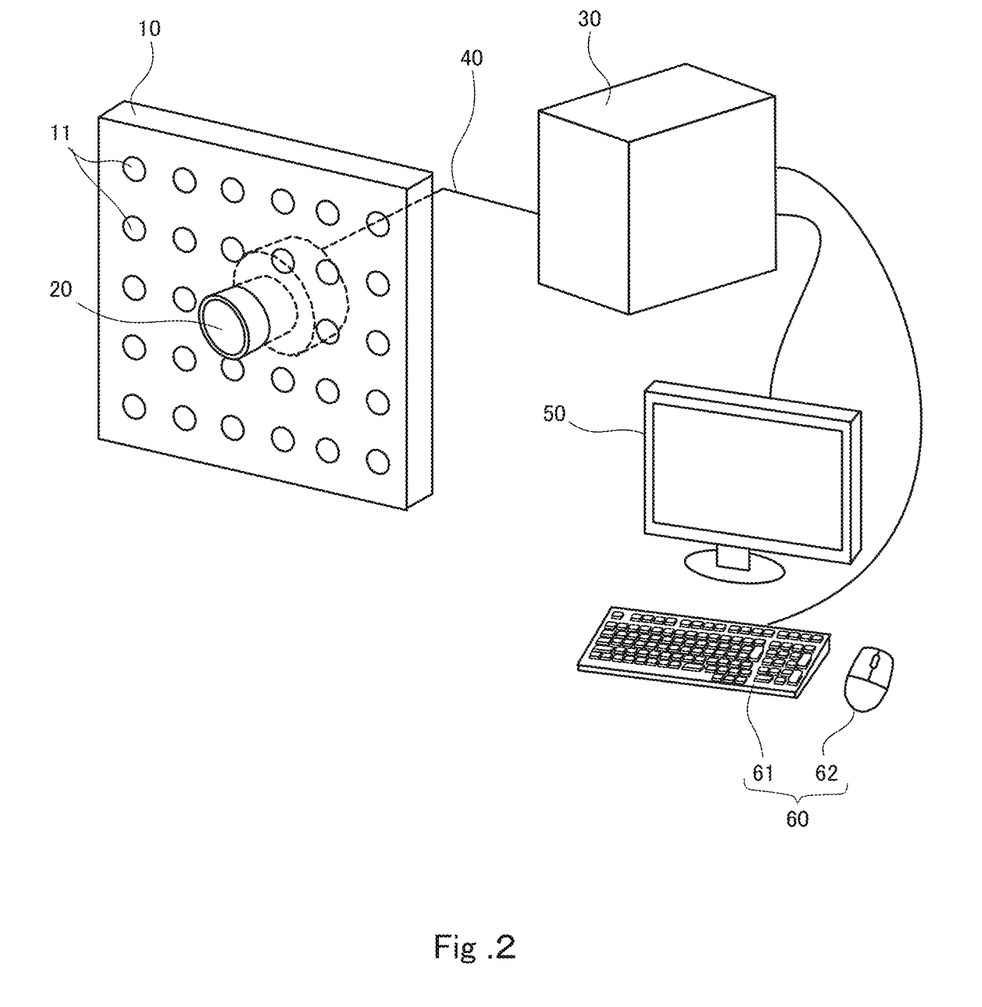
FIG. 2 is a conceptual diagram illustrating an example of a configuration of an image processing device corresponding to at least one of the embodiments of the present invention.

Next, a configuration example of an image processing device corresponding to at least one of the embodiments of the present invention will be described. FIG. 2 is a conceptual diagram illustrating an example of a configuration of an image processing device corresponding to at least one of the embodiments of the present invention. In the example of FIG. 2, an example in which LEDs as the plurality of light sources 11 are arranged on a light-source fixing plate is illustrated as the configuration of the lighting unit 10. In addition, in the example of FIG. 2, a lens of the camera unit 20 is configured to protrude from the back surface side toward the front surface side at a substantially central position of the light-source fixing plate. In this manner, by arranging the plurality of light sources 11 substantially evenly on the upper, lower, left, and right sides of the lens of the camera unit 20, when the lighting unit 10 and the camera unit 20 face an object to be photographed in such a manner that the optical axis of the lens is directed to the object, it is possible to irradiate the object with light from the upper, lower, left, and right sides. The lighting unit 10 and the camera unit 20 are each connected to a computer as the control unit 30 via a signal cable 40. A display device 50 and an input device 60 such as a keyboard 61 and a mouse 62 are connected to the computer as the control unit 30 to be used. Note that the example of fixing the lighting unit 10 and the camera unit 20 to the same light-source fixing plate in FIG. 2 is merely an example, and the present invention is not limited thereto.

Figure 3:
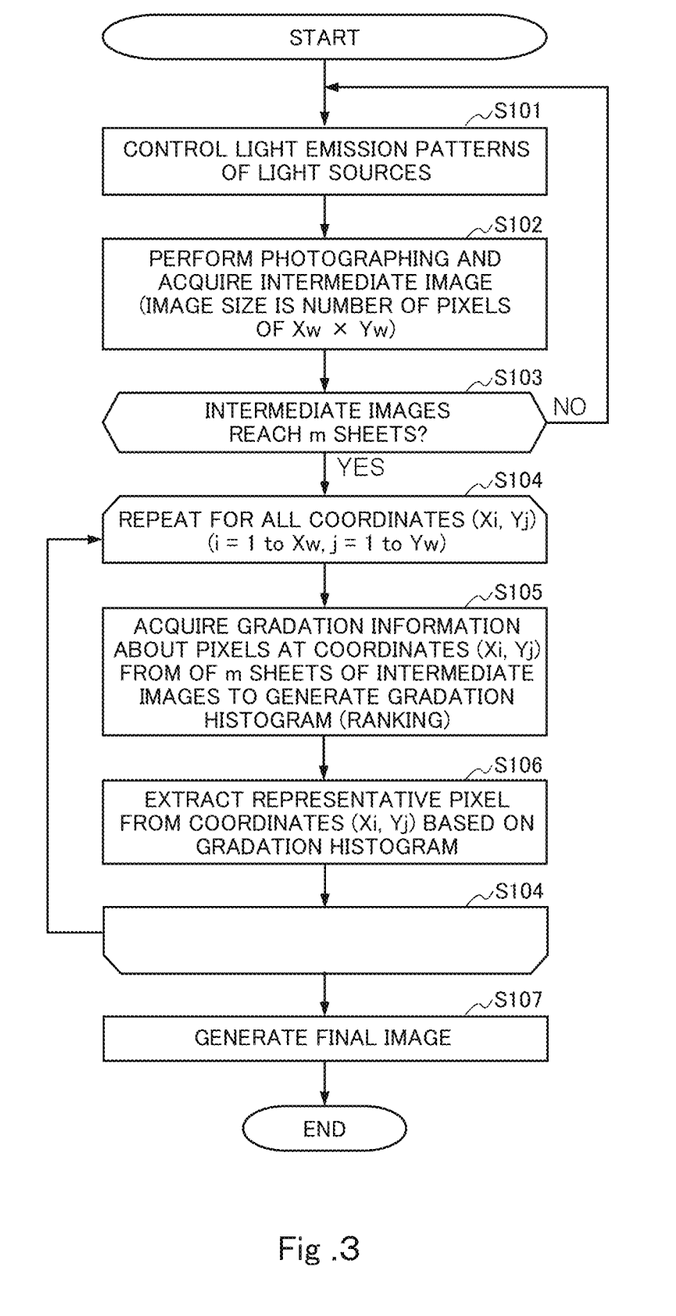
FIG. 3 is a flowchart illustrating an example of a procedure of image generation processing corresponding to at least one of the embodiments of the present invention.

Next, a procedure of image generation processing in the image processing device 100 corresponding to at least one of the embodiments of the present invention will be described. FIG. 3 is a flowchart illustrating an example of a procedure of image generation processing corresponding to at least one of the embodiments of the present invention. In FIG. 3, the image generation processing is started by the control unit 30 of the image processing device 100 controlling the light emission patterns of the light sources in order to acquire intermediate image data (step S101). Next, the control unit 30 of the image processing device 100 performs photographing on an object irradiated with light with a controlled light emission pattern to acquire intermediate image data (step S102). Here, the image size of an intermediate image is assumed to be Xw pixels in the horizontal direction and Yw pixels in the vertical direction. That is, the number of pixels of the intermediate image can be expressed as Xw×Yw. Next, the control unit 30 of the image processing device 100 determines whether the photographed intermediate image data has reached m sheets, which is a predetermined number set in advance (step S103). When the intermediate image data has not reached m sheets (NO in S103), the control unit 30 of the image processing device 100 repeats steps S101 to S103 to acquire intermediate image data with different light emission patterns. On the other hand, when the intermediate image data has reached m sheets (S103—YES), steps S105 and S106 are repeatedly performed for all the coordinates (Xi, Yj) of the intermediate image (loop structure of S104), where i represents the coordinate information about a pixel position in the horizontal direction and is in a range of i=1 to Xw, and j represents the coordinate information about a pixel position in the vertical direction and is in a range of j=1 to Yw. Next, the control unit 30 of the image processing device 100 acquires gradation information about the pixels at the coordinates (Xi, Yj) of the acquired m sheets of intermediate image data to generate a gradation histogram (ranking) (step S105). Next, the control unit 30 of the image processing device 100 extracts a representative pixel for the pixel of the current interest coordinates (Xi, Yj) based on the generated gradation histogram (ranking) (step S106). In the extraction of the representative pixel, a pixel corresponding to the median value in the gradation histogram may be extracted as the representative pixel, or a pixel having a predetermined n-th value from the top or the bottom in the gradation histogram may be extracted as the representative pixel, for example. In this manner, the control unit 30 of the image processing device 100 repeats steps S105 and S106 to perform the processing of extracting the representative pixels for all the coordinates (Xi, Yj) of the intermediate image data. Finally, the image processing device 100 combines all the extracted representative pixels to generate final image data (S107).

Figure 4:
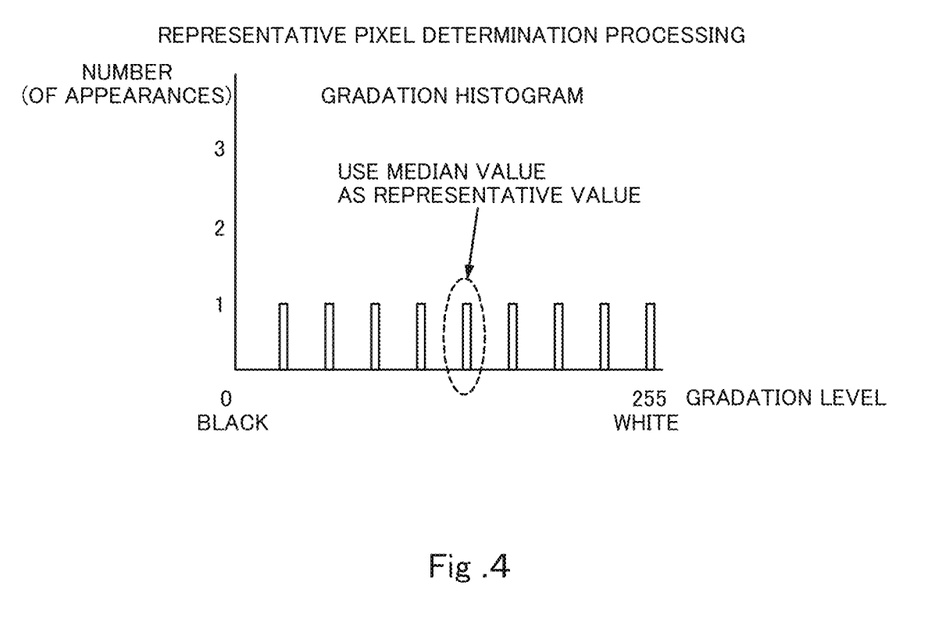
FIG. 4 is an explanatory diagram illustrating a method of determining a representative pixel in image generation processing corresponding to at least one of the embodiments of the present invention.

FIG. 4 is an explanatory diagram illustrating a method of determining a representative pixel in image generation processing corresponding to at least one of the embodiments of the present invention. FIG. 4 illustrates a case where a method of using, as a representative pixel, a pixel whose gray-value (luminance-value) rank is positioned at a median value is adopted, as an example of a method of ranking a plurality of pixels at the same position in a plurality of intermediate images by gray values, that is, based on a gradation histogram. The example of FIG. 4 illustrates a case where, when nine pieces of intermediate image data are acquired by photographing the object nine times, gray values of the pixels at predetermined coordinates (Xi, Yj) in each of the intermediate image data are acquired and ranked, and, as a result, data of the nine gray values are evenly distributed. In this case, the median value corresponds to the fifth value in the gradation histogram of FIG. 4 when counted from either the left or the right, and thus the pixel having this median value is extracted as the representative pixel. Note that, if there is a plurality of pixels having the same gray value and the median value is at the position where the plurality of pixels is distributed, the same content is obtained even if any pixel of the plurality of intermediate images is adopted as the representative pixel, and which does not matter.

Figure 5A:
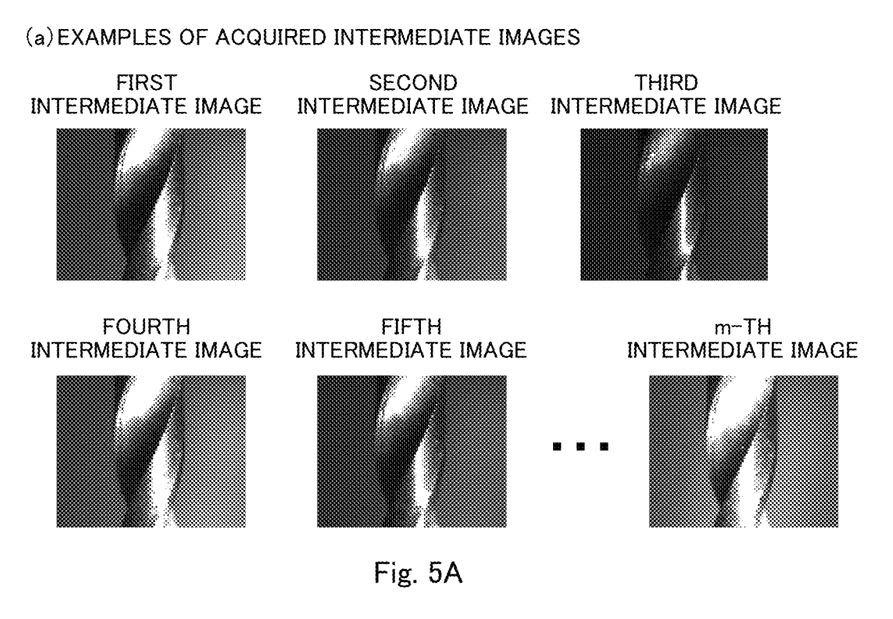
FIGS. 5A-5C are explanatory diagrams illustrating an example of a result using an image processing device corresponding to at least one of the embodiments of the present invention.
Figure 5B:
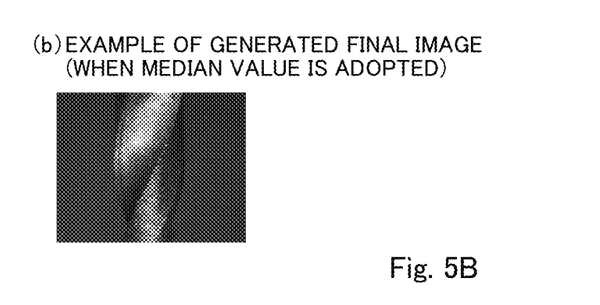
Figure 5C:
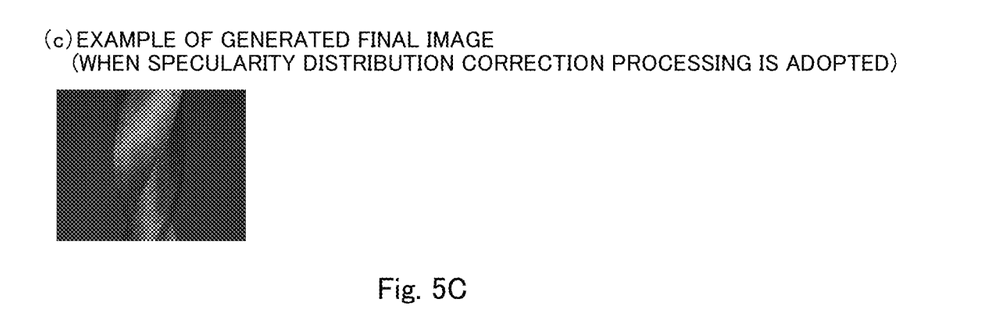

FIGS. 5A-5C are explanatory diagrams illustrating an example of a result using an image processing device corresponding to at least one of the embodiments of the present invention. FIG. 5A shows photographs each showing a part of intermediate image data when the blade of a drill as an object is photographed m times to acquire m pieces of intermediate image data. As shown in FIG. 5A, since photographing is performed by variously changing the light emission patterns of the light sources, there are intermediate image data including a position where blown-out highlights are generated due to specular reflection and intermediate image data including a state close to blocked-up shadows. On the other hand, FIG. 5B shows an example of final image data generated by a method of adopting the median value as the representative pixel using the m pieces of intermediate image data. As shown in FIG. 5B, it can be seen that a final image in which blown-out highlights and blocked-up shadows are almost eliminated to improve the state but the edge, the texture of the surface, and the like of the drill are not lost can be acquired.

As described above, the image processing device according to the present invention is configured to include a lighting unit including a plurality of light sources that irradiates an object with light and a control circuit that controls light emission of the plurality of light sources, a camera unit that photographs the object, and a control unit that controls switching of a light emission pattern of the plurality of light sources of the lighting unit and controls photographing execution timing of the camera unit, in which the control unit includes a light-emission-pattern control unit that controls the plurality of light sources of the lighting unit in such a manner as to be able to emit light with a plurality of light emission patterns, a photographing processing unit that performs photographing at timings during at least two or more patterns among the plurality of light emission patterns to acquire a plurality of intermediate images, and an image generation unit that generates one final image based on the plurality of acquired intermediate images, and it is possible to acquire an inspection image without blown-out highlights generated due to specular reflection or the like or blocked-out shadows generated at a position to which light hardly reaches.

Second Embodiment

In the first embodiment, as the method of extracting a representative pixel, an example of extracting, as a representative pixel, a pixel corresponding to a median value when ranking is performed based on gray values has been described, but the method is not limited thereto. It is also possible to adopt a method of extracting a representative pixel by which blown-out highlights and blocked-up shadows are more hardly generated.

Figure 6A:
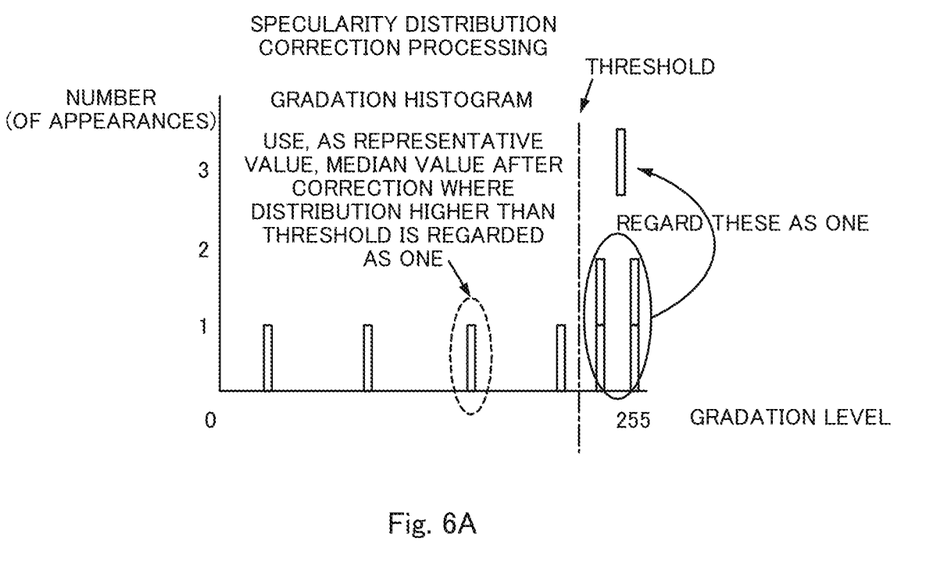
FIGS. 6A and 6B are explanatory diagrams illustrating a method of determining a representative pixel in image generation processing corresponding to at least one of the embodiments of the present invention.

FIGS. 6A and 5B are explanatory diagrams illustrating a method of determining a representative pixel in image generation processing corresponding to at least one of the embodiments of the present invention. FIG. 6A illustrates an example of a gradation histogram when a lot of specular reflection occurs. When a lot of specular reflection occurs, many pixels are distributed at a position having a high luminance value close to blown-out highlights and concentrated. When a pixel positioned at a median value is extracted as a representative pixel in this state, the representative pixel is extracted from the position substantially close to blown-out highlights, and the influence of specular reflection remains in the final image. For this reason, as illustrated in FIG. 6A, by setting a threshold to a predetermined luminance value in the gradation histogram, pixels distributed at a position having a luminance value higher than the threshold are regarded as "one" although a large number of pixels are distributed at the position having the luminance value higher than the threshold, and a representative pixel corresponding to the median value in this state is extracted. In this manner, by regarding pixels distributed at the position having the luminance value higher than the threshold as "one", the median value moves from a position having a high luminance value to a position having an intermediate luminance value, and the luminance value of a pixel selected as the representative pixel becomes a value away from blown-out highlights. As a result, it is possible to acquire a final image in which the influence of specular reflection hardly remains. Note that, if the representative pixel determination processing of FIG. 6A is adopted for the m pieces of intermediate image data of FIG. 5A, the final image data shown in FIG. 5C can be acquired. When the image of FIG. 5C is compared with FIG. 5B adopting a simple median value, it can be seen that the influence of specular reflection is further weakened in FIG. 5C.

Figure 6B:
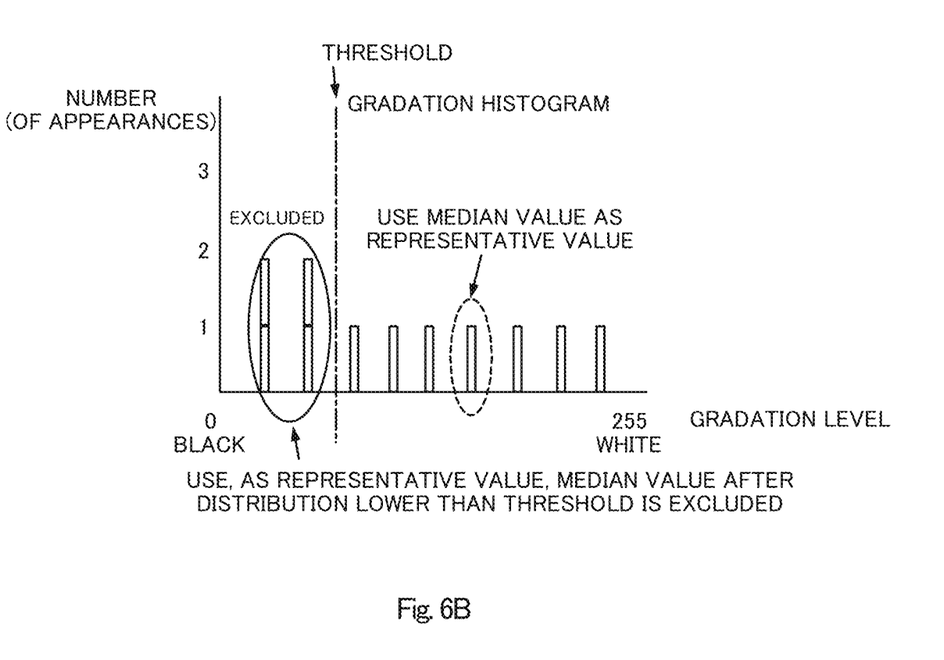

FIG. 6B illustrates an example of a gradation histogram when many situations close to blocked-up shadows occur. When many situations close to blocked-up shadows occur, many pixels are distributed at a position having a low luminance value close to blocked-up shadows and concentrated. When a pixel positioned at the median value is extracted as a representative pixel in this situation, the luminance value of the pixel extracted as the representative pixel is also low, and the final image is also dark. For this reason, as illustrated in FIG. 6B, by setting a threshold to a predetermined luminance value in the gradation histogram, pixels distributed at a position having a luminance value lower than the threshold are regarded as "zero" although a large number of pixels are distributed at the position having the luminance value lower than the threshold, and a representative pixel corresponding to the median value in this state is extracted. In this manner, by regarding pixels distributed at the position having the luminance value lower than the threshold as "zero", the median value moves from the position having a low luminance value to the position having an intermediate luminance value, and the luminance value of the pixel selected as the representative pixel becomes a value away from blocked-up shadows. As a result, it is possible to acquire a final image that is not too dark in the case of many intermediate images close to blocked-up shadows.

In the examples of FIGS. 6A and 6B, the distribution outside the threshold is regarded as "one" or "zero", but this is merely an example. That is, in a generalized expression, the image generation unit 33 regards, when there is a plurality of distributions at a position having a value higher than a predetermined upper-limit threshold for the gray values and/or a position having a value lower than a predetermined lower-limit threshold for the gray values, the plurality of distributions as a predetermined fixed number regardless of an actual number of distributions to perform the ranking based on the gray values. The predetermined fixed number here is not effective when it is a value larger than the number of distributions, but as long as it is a fixed number assumed to be a value smaller than the number of distributions even if it is not "one" or "zero", it is possible to extract a representative pixel in such a manner that blown-out highlights and blocked-up shadows do not occur.

Third Embodiment

Figure 7A:
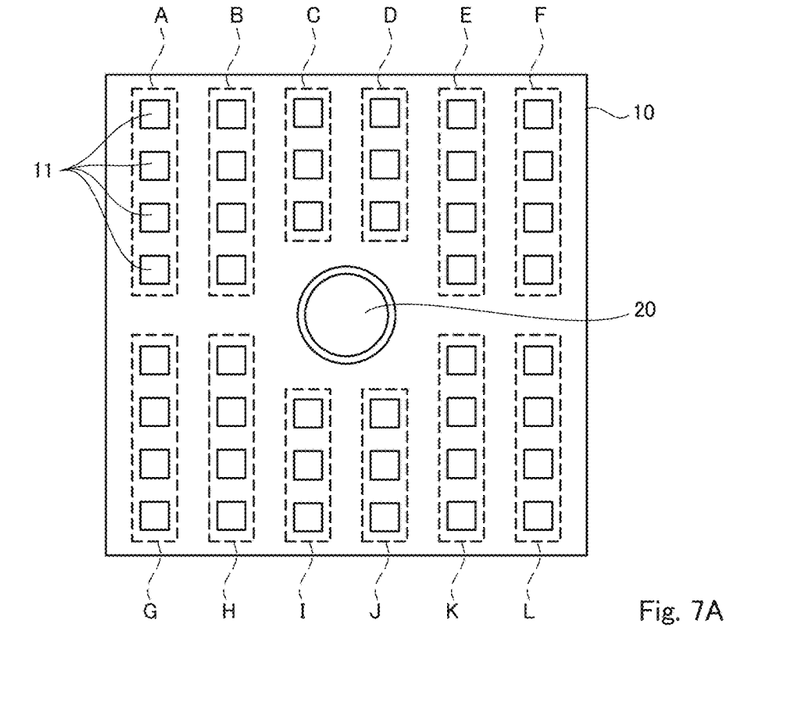
FIGS. 7A and 7B are explanatory diagrams illustrating an example of arrangement of a lighting unit and a camera unit in an image processing device corresponding to at least one of the embodiments of the present invention.
Figure 7B:
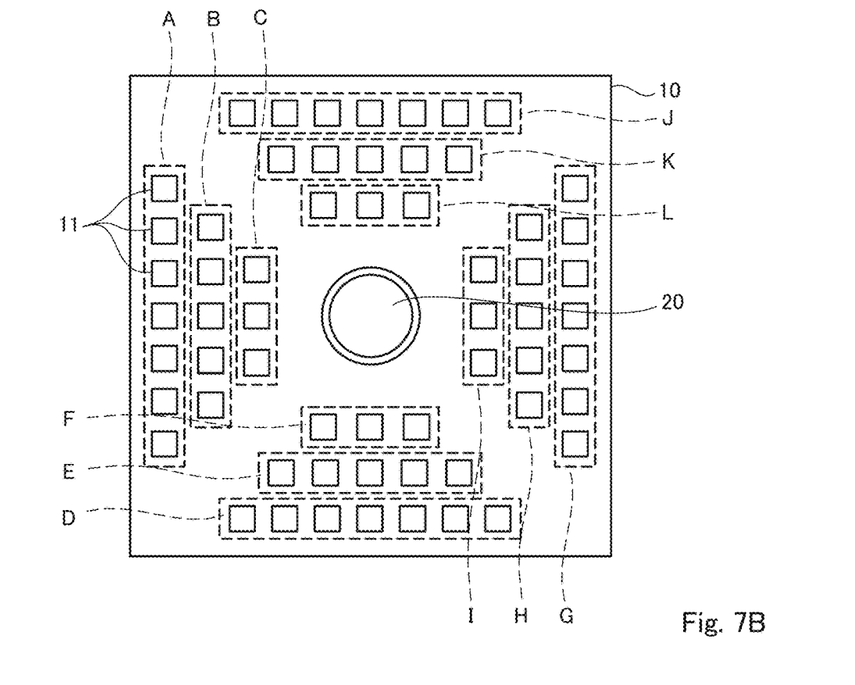

In the first and second embodiments, the specific arrangement of the light sources 11 of the lighting unit 10 has not been described, but the light sources 11 may be arranged as illustrated in FIGS. 7A and 7B, for example.

FIGS. 7A and 7B are explanatory diagrams illustrating an example of arrangement of a lighting unit and a camera unit in an image processing device corresponding to at least one of the embodiments of the present invention. FIG. 7A illustrates an example in which a camera unit 20 is arranged in the center, LEDs as a plurality of light sources 11 are arranged in such a manner as to be aligned in a column direction, and the LEDs as the plurality of light sources adjacent to each other in the vertical direction are blocked (grouped) to form 12 blocks of A to L. In such a configuration, it is conceivable that, for example, control content is to control, by causing the vertically adjacent respective two blocks of A and G, B and H, C and I, D and J, E and K, and F and L to simultaneously emit light, light emission patterns in such a manner that the light-emission rows sequentially move rightward from A and G on the left side. It can be said that such control is effective control content when it is desired to photograph an object by changing the position of the light sources in the horizontal direction although it is not necessary to change the position of the light sources in the vertical direction.

FIG. 7B illustrates an example in which the camera unit 20 is arranged in the center, LEDs as the plurality of light sources 11 are arranged in each of four triangular areas when a square light-source fixing plate is divided into the four areas by its diagonal lines, and three blocks (groups) are further formed in each area to form 12 blocks of A to L. In such a configuration, by, for example, controlling on/off of the respective three blocks A to C, D to F, G to I, and J to L positioned in the four areas in order for each area to emit light, it is possible to selectively use a situation in which light is emitted and a situation in which light is not emitted in any of the upper, lower, left, and right directions. Furthermore, it is also possible to adjust the intensity of light depending on which of the three blocks in the same area is caused to emit light. Such control can be said to be effective control content when it is desired to photograph an object by being evenly irradiated with light from all of the upper, lower, left, and right directions or without irradiation from either of the upper, lower, left, or right direction.

In addition, according to the arrangement of the lighting unit 10 and the camera unit 20 illustrated in FIGS. 7A and 7B, there is an advantageous effect in a place where dustproof, oil resistance, or water resistance is required, such as the vicinity of a machine tool.

Conventionally, a cylindrical or semi-cylindrical illumination device called ring illumination has been used to irradiate a cylindrical object such as a drill with light from multiple directions. However, in the case of ring illumination, the ring illumination is used with an object placed near the center of its diameter, and the ring illumination is often arranged near the object. On the other hand, a camera is arranged at some distance from the object for proper photographing of the object. As a result, the ring illumination and the camera are arranged at positions separated to some extent.

Here, in consideration of dustproof or the like, it is desirable to accommodate the camera and the illumination device in a housing. However, in the case of adopting the ring illumination, it is necessary to prepare separate housings for the camera and the ring illumination or prepare a large-sized housing due to the above circumstance. As a result, this causes a problem of being difficult in arrangement in a place where a sufficient space cannot be secured, such as the vicinity of a machine tool. Furthermore, since the housing accommodating the ring illumination has a shape surrounding the object similarly to the ring illumination, the shape becomes complicated, which is also a problem.

In this regard, since the lighting unit 10 in the present embodiment has a planar structure and can secure a distance from an object, the lighting unit 10 can be arranged close to the camera unit 20 as illustrated in FIGS. 7A and 7B. Thus, the lighting unit 10 and the camera unit 20 can be easily accommodated in one housing. In addition, with the lighting unit 10, since it is not necessary to surround an object unlike the ring illumination, the housing accommodating the lighting unit 10 can have a simple shape. Furthermore, it is easy to reduce the size of the housing in consideration of these points. As a result, as compared with the case of adopting the ring illumination, there is an advantageous effect that it is easy to introduce even in the vicinity of a machine tool or the like where only a small space can be secured. Note that, in order to irradiate an object with light and photograph the object, the housing may be provided with an opening as small as possible in front of the lighting unit 10 and the camera unit 20, but it is desirable to form the entire housing or only the front of the lighting unit 10 and the camera unit 20 with a transparent member such as glass in consideration of dustproof or the like.

Fourth Embodiment

In the first to third embodiments, a representative pixel is extracted for each pixel by ranking gray values of a plurality of pieces of intermediate image data in order for the image generation unit 33 to generate final image data, but the present invention is not limited to this configuration. For example, a predetermined region including a plurality of pixels may be used as a unit of comparison instead of one pixel.

For example, four pixels of 2×2 can be set as a region for a comparison unit, or nine pixels of 3×3 can be set as a region for a comparison unit. In this case, it is conceivable to determine in advance which pixel in the region is used to rank the gray values. For example, the upper left pixel may be used for comparison for ranking in the case of four pixels of 2×2, or the center pixel may be used for comparison for ranking in the case of nine pixels of 3×3. Then, in order to perform the ranking based on gray values for a region at the same position in each of a plurality of intermediate images, the gray value of a pixel at a predetermined position in the region is compared as the gray value of the region. Then, for example, the region of the intermediate image data including a pixel corresponding to the gray value of a median value is extracted as a representative region. That is, the comparison of gray values is performed based on the gray value of one pixel in the region, but all the pixel data included in the representative region is adopted for a final image. When these are generalized, it can be said that the image generation unit 33 is configured to perform ranking of a plurality of regions based on gray values, the plurality of regions each including at least one or more pixels and being at the same position in each of the plurality of intermediate images, to extract representative regions based on the ranking, and to combine the representative regions to generate the final image.

As described above, since the comparison of regions is performed by only one pixel even if four pixels of 2×2 or nine pixels of 3×3 are defined as a region for a comparison unit, the amount of calculation can be reduced as compared with the examples of the first to third embodiments in which the representative pixel extraction processing is performed for all the pixels.

REFERENCE SIGNS LIST

100 Image processing device
10 Verification unit
11 Light source
20 Camera unit
30 Control unit
31 Light-emission-pattern control unit
32 Photographing processing unit
33 Image generation unit
34 Storage unit
40 Signal cable
50 Display device
60 Input device
61 Keyboard
62 Mouse

The invention claimed is:

1. An image processing device comprising:
a plurality of light sources configured to irradiate an object with light and a control circuit configured to control light emission of the plurality of light sources;
a camera configured to photograph the object; and
a processor configured to control switching of a light emission pattern of the plurality of light sources and to control photographing execution timing of the camera,
wherein the processor is configured to:
control the plurality of light sources to emit light with a plurality of light emission patterns;
photograph the object at a plurality of times during at least two or more patterns among the plurality of light emission patterns to obtain a plurality of intermediate images; and
generate one final image based on the plurality of intermediate images, and
the processor is further configured to:
perform ranking of a plurality of regions based on gray values, the plurality of regions each including at least one or more pixels and being at the same position in each of the plurality of intermediate images;
extract representative regions based on the ranking; and
combine the representative regions to generate the final image.

2. The image processing device according to claim 1, wherein
the processor is configured to extract, as the representative regions, regions each having a median value of the gray values as a result of the ranking based on the gray values.

3. The image processing device according to claim 1, wherein
the processor is configured to perform the ranking based on the gray values by regarding a number of a plurality of pixels in a distribution as a predetermined fixed value regardless of an actual number of pixels in the distribution, when there is the plurality of pixels in the distribution at a position having a value higher than a predetermined upper-limit threshold for the gray values and/or a position having a value lower than a predetermined lower-limit threshold for the gray values.

4. The image processing device according to claim 1, wherein the processor is configured to classify the plurality of light sources into a plurality of blocks and to perform on/off control for each block to change the light emission pattern.

5. The image processing device according to claim 1, wherein
the processor is configured to classify the plurality of light sources into a plurality of blocks and to change luminance and/or color tone of the plurality of light sources for each block to change the light emission pattern.

6. A non-transitory computer readable medium comprising an image processing program causing a computer to perform:
controlling, with a plurality of light emission patterns, light emission of a plurality of light sources configured to irradiate the object with light;
photographing the object with a camera at a plurality of times during at least two or more patterns among the plurality of light emission patterns to obtain a plurality of intermediate images; and
generating a final image based on the plurality of intermediate images, wherein
the image processing program further causes the computer to perform:
performing ranking of a plurality of regions based on gray values, the plurality of regions each including at least one or more pixels and being at the same position in each of the plurality of intermediate images;
extracting representative regions based on the ranking; and
combining the representative regions to generate the final image.

7. The non-transitory computer readable medium of claim 6, wherein the image processing program further causes the computer to perform:
extracting, as the representative regions, regions each having a median value of the gray values as a result of the ranking based on the gray values.

8. The non-transitory computer readable medium of claim 6, wherein the image processing program further causes the computer to perform:
performing the ranking based on the gray values by regarding a number of a plurality of pixels in a distribution as a predetermined fixed value regardless of an actual number of pixels in the distribution, when there is the plurality of pixels in the distribution at a position having a value higher than a predetermined upper-limit threshold for the gray values and/or a position having a value lower than a predetermined lower-limit threshold for the gray values.

9. The non-transitory computer readable medium of claim 6, wherein the image processing program further causes the computer to perform:
classifying the plurality of light sources into a plurality of blocks and to perform on/off control for each block to change the light emission pattern.

10. A method of image generation processing comprising:
controlling, with a plurality of light emission patterns, light emission of a plurality of light sources configured to irradiate an object with light;
photographing the object with a camera at a plurality of times during at least two or more patterns among the plurality of light emission patterns to obtain a plurality of intermediate images; and
generating a final image based on the plurality of acquired intermediate images, wherein
the method further comprises:
performing ranking of a plurality of regions based on gray values, the plurality of regions each including at least one or more pixels and being at the same position in each of the plurality of intermediate images;
extracting representative regions based on the ranking; and
combining the representative regions to generate the final image.

11. The method of claim 10, further comprising:
extracting, as the representative regions, regions each having a median value of the gray values as a result of the ranking based on the gray values.

12. The method of claim 10, further comprising:
performing the ranking based on the gray values by regarding a number of a plurality of pixels in a distribution as a predetermined fixed value regardless of an actual number of pixels in the distribution, when there is the plurality of pixels in the distribution at a position having a value higher than a predetermined upper-limit threshold for the gray values and/or a position having a value lower than a predetermined lower-limit threshold for the gray values.

13. The method of claim 10, further comprising:
classifying the plurality of light sources into a plurality of blocks and to perform on/off control for each block to change the light emission pattern.

14. The method of claim 10, further comprising:
classifying the plurality of light sources into a plurality of blocks and to change luminance and/or color tone of the plurality of light sources for each block to change the light emission pattern.

* * * * *